US011228587B2

(12) United States Patent
Van Prooijen et al.

(10) Patent No.: US 11,228,587 B2
(45) Date of Patent: Jan. 18, 2022

(54) METHOD, SYSTEM, DEVICE AND SOFTWARE PROGRAMME PRODUCT FOR THE REMOTE AUTHORIZATION OF A USER OF DIGITAL SERVICES

(71) Applicant: MORPHO B.V., Haarlem (NL)

(72) Inventors: Joost Van Prooijen, Haarlem (NL); Claire Durand, Haarlem (NL); Rodolphe Hugel, Haarlem (NL); Jouri De Vos, Haarlem (NL)

(73) Assignee: MORPHO B.V., Haarlem (NL)

( * ) Notice: Subject to any disclaimer, the term of this patent is extended or adjusted under 35 U.S.C. 154(b) by 261 days.

(21) Appl. No.: 15/998,720

(22) PCT Filed: Feb. 16, 2017

(86) PCT No.: PCT/NL2017/050094
§ 371 (c)(1),
(2) Date: Aug. 16, 2018

(87) PCT Pub. No.: WO2017/142407
PCT Pub. Date: Aug. 24, 2017

(65) Prior Publication Data
US 2020/0259825 A1 Aug. 13, 2020

(30) Foreign Application Priority Data
Feb. 16, 2016 (NL) ..................................... 2016272

(51) Int. Cl.
*H04L 29/06* (2006.01)
*G06K 9/00* (2006.01)
(52) U.S. Cl.
CPC ...... *H04L 63/0861* (2013.01); *G06K 9/00288* (2013.01); *H04L 63/0853* (2013.01)

(58) Field of Classification Search
CPC ............ H04L 63/0861; H04L 63/0853; G06K 9/00288; G06F 21/32
See application file for complete search history.

(56) References Cited

U.S. PATENT DOCUMENTS 8,887,232 B2 * 11/2014 McKay ................. H04L 9/3231
726/2
10,140,537 B2 * 11/2018 Sahin ................. H04N 5/23222
(Continued)

FOREIGN PATENT DOCUMENTS

DE 10 2014 100463 A1 7/2015
WO 2009/070430 A2 6/2009

OTHER PUBLICATIONS

International Search Report, dated May 8, 2017, from corresponding PCT/NL2017/050094 application.

*Primary Examiner* — Christopher A Revak
(74) *Attorney, Agent, or Firm* — Nixon & Vanderhye

(57) ABSTRACT

Disclosed is a method of authorizing a user for accessing a server and/or for receiving of an on-line service and the steps of: capturing biometric data of the user using the sensor on a ME; forming from the biometric data a biometric template on the IDS and storing the biometric template on the MED; and via the IDS allowing access to a server by the user providing to the IDS, via the MED, matching biometric data and a biometric template. On the MED, a local check can be made for a match between biometric data of the user that are captured using the sensor on the MED and biometric data read out of the memory.

20 Claims, 9 Drawing Sheets

(56) References Cited

U.S. PATENT DOCUMENTS

| | | |
|---|---|---|
| 2003/0023858 A1 | 1/2003 | Banerjee et al. |
| 2009/0132813 A1 | 5/2009 | Schibuk |
| 2011/0145904 A1 | 6/2011 | Pizano et al. |
| 2013/0305059 A1* | 11/2013 | Gormley ............... H04L 9/0866 713/189 |
| 2014/0317715 A1* | 10/2014 | Conner ............. G06K 19/0718 726/7 |
| 2015/0088778 A1 | 3/2015 | Tsao et al. |
| 2017/0061441 A1* | 3/2017 | Kamal ............. G06Q 20/40145 |
| 2017/0213211 A1* | 7/2017 | Sibert ................ G06Q 20/4014 |
| 2019/0089702 A1* | 3/2019 | Bhatt ................. H04L 63/0442 |

* cited by examiner

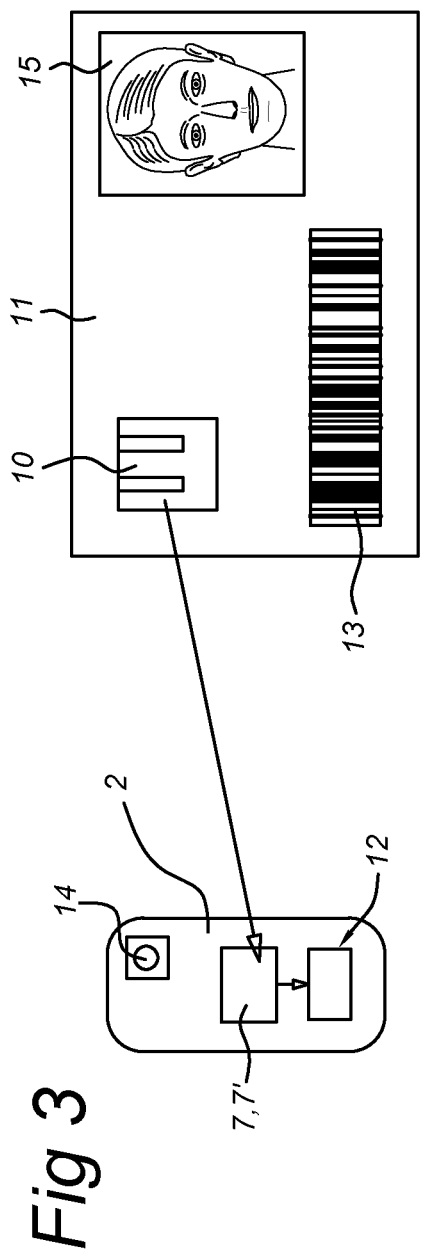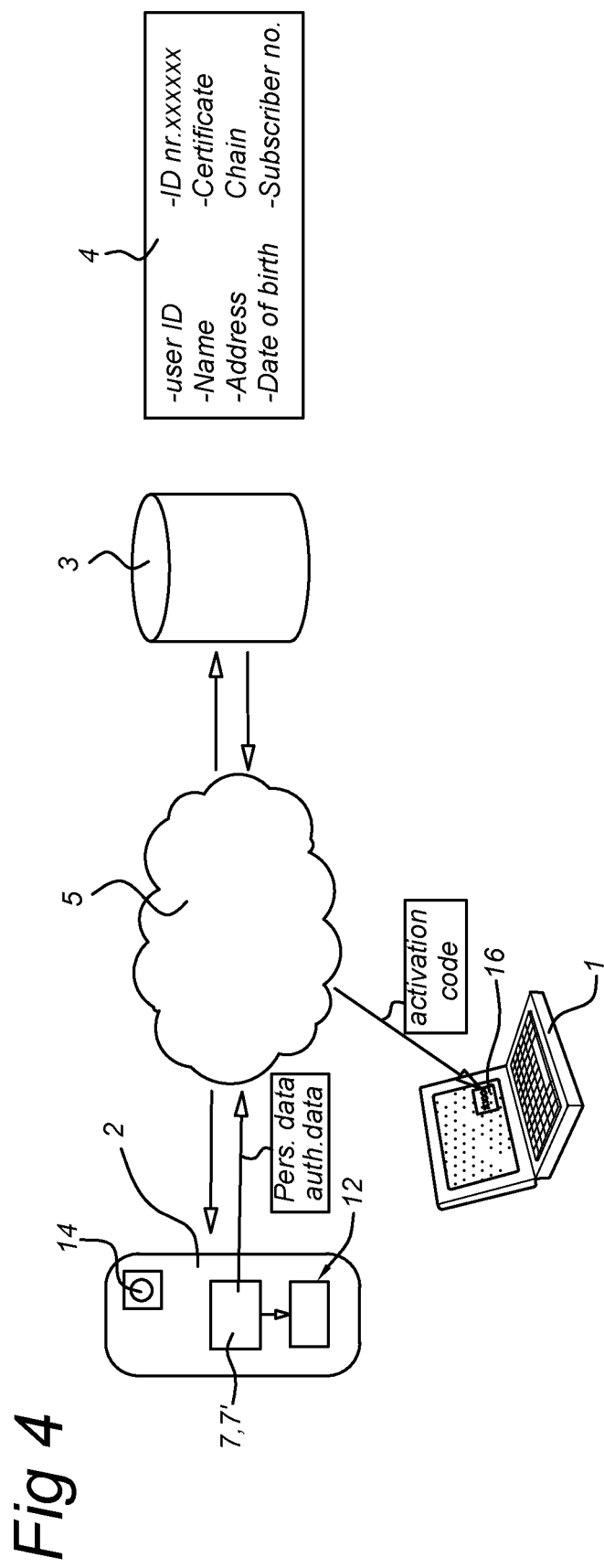

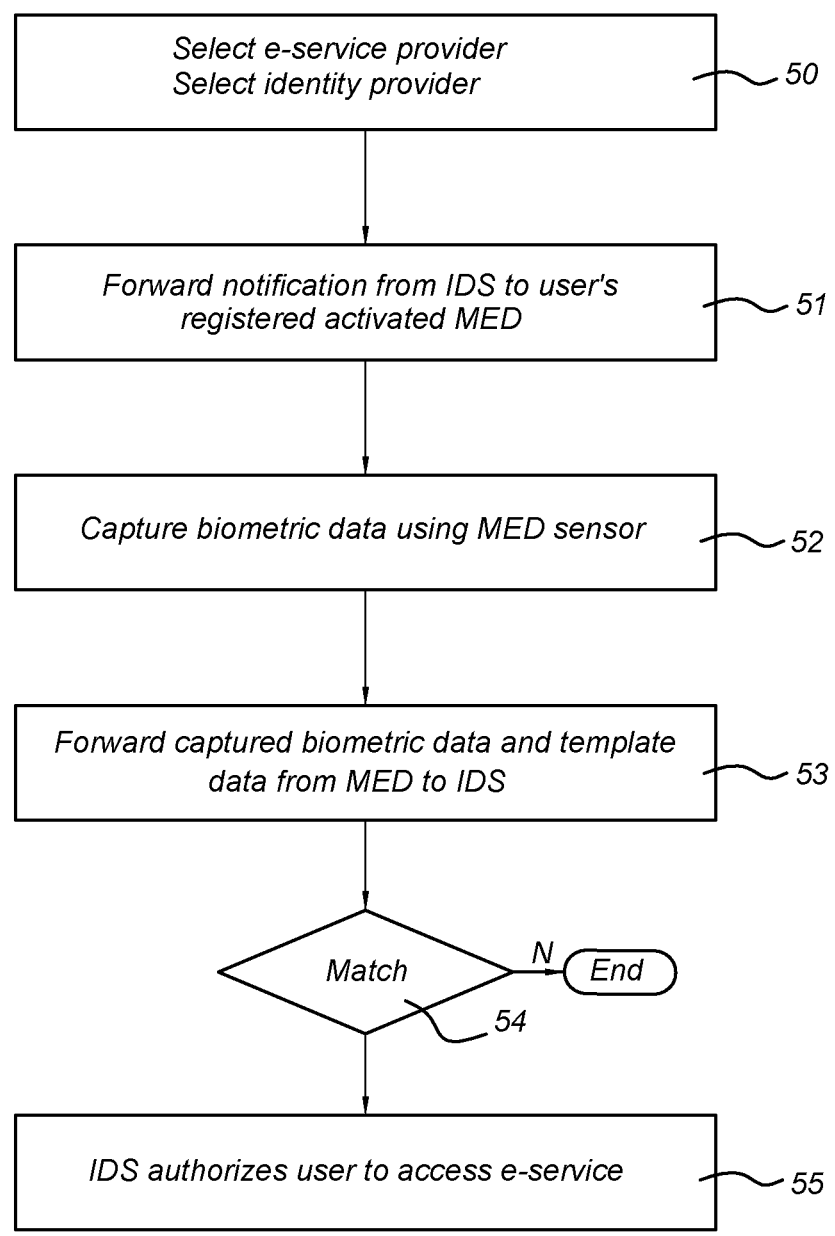

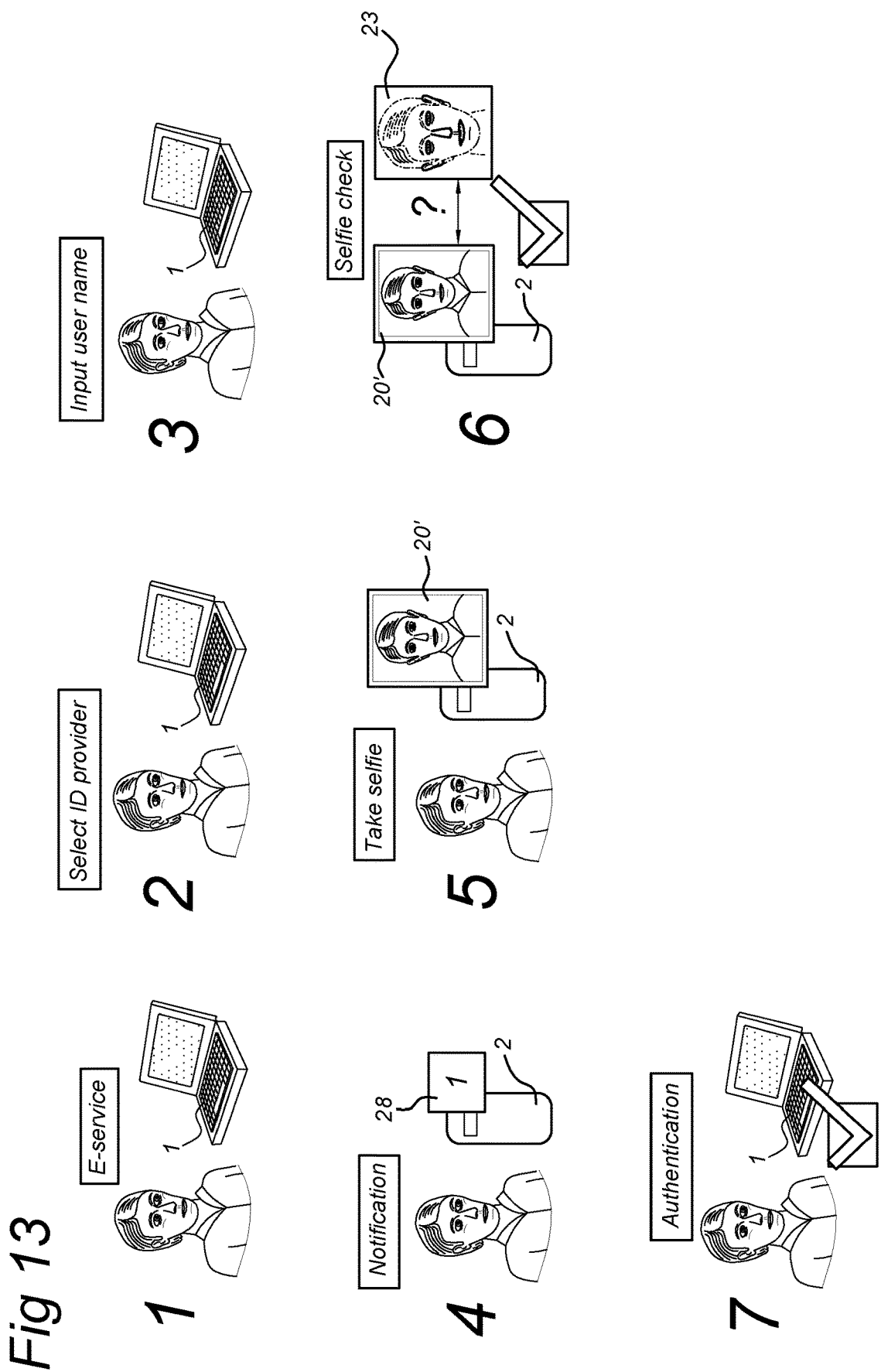

METHOD, SYSTEM, DEVICE AND SOFTWARE PROGRAMME PRODUCT FOR THE REMOTE AUTHORIZATION OF A USER OF DIGITAL SERVICES

BACKGROUND OF THE INVENTION

The invention relates to a method of authorizing a user on a server, in particular for participating in electronic transactions on the server or on a network connected to the server.

The invention also relates to a system and a device for authorizing a user on a server and to a computer program product for use in such system and device.

FIELD OF THE INVENTION

WO 2009/070430 describes a computer-implemented method for distributed public key infrastructures (PKI). In the distributed PKI, authentication data are stored on an edge device, such as a mobile phone, a personal digital assistant (PDA) and the like which is carried to place of intended use for presenting authentication data directly to a relying party system over a short-range data network. No remote validation service is required, saving bandwidth usage and response time.

The process of authenticating the individual to participate in a transaction with the relying party involves storing a set of credential data on the mobile device. The credential data may be derived from a passport, a birth certificate, a Common Access Card (CAC), a smartcard, a driver's license and the like. Entering authentication data to gain access to the mobile phone (page 4 or FIG. 1) may include entering data pertaining to a fingerprint, a photograph, an iris scan, a password or a personal identification number (PIN).

US 2015/0088778 describes a system and method for authorizing an individual or a group of individuals travelling, for passing customs control utilizing a personal electronic device on which a software application (App) has been downloaded and installed. The traveler inputs personal data into the electronic device for instance by scanning the passport using the optical character recognition function in a kiosk and saves this information on the mobile device. Also a photograph is taken and saved on the device, and a number of questions, depending on the destination of travel of the user, are answered. Upon arrival in the jurisdiction, the passport information of the user, or group of users and answers to the questions are presented to the customs authority. If passage is granted, the traveler will be issued with a secure encrypted receipt in the form of a QR code on the App. The traveler presents this QR code to a reader to be allowed access to the jurisdiction.

US 2003/0023858 describes a method for generating secure e-passports and e-visas. The individual seeking an electronic identification document in a first step obtains, on his personal computer, an electronic form from the issuing authority, including a unique serial number and digital watermark to detect forgeries. In a next step the individual provides relevant data such as name, address, birth etc. and electronically signs the electronic form. Next, the issuing authority adds a secure digital certificate and encrypts the ePassport, which is downloaded on a mobile device, such as a PDA, mobile phone etc. The ePassport on the mobile device may present a photograph. Upon showing the ePassport at appropriate checkpoints, such as on going through customs, the user uploads the ePassport from his mobile device into the authorities' verification mechanism via Bluetooth for verification of the electronic signature and certificate.

It is an object of the present invention to provide a secure process, system, device and computer program product for authorization of a user to access a server or to receive an e-service via a Mobile Electronic Device, the user holding an identity document.

With the term "identity document" as used herein, a passport, a paper or plastics identity card, driver's license, credit card or bank card, identification badge, and e-passport or a chip comprising authentication and/or personalization data such as name, address, a digital portrait or other biometric data such as a thumb print, iris scan and the like is intended.

SUMMARY OF THE INVENTION

Hereto a method of authorizing a user for accessing a server and/or for receiving of an on-line service, involves the step of providing a mobile electronic device (MED), the MED having a memory unit and a sensor for receiving biometric data, the step of providing an Identity Document Server IDS comprising for a set of holders of an identity document, authentication data and personalization data corresponding to the respective identity document, the method further comprising the steps of:

a. Loading a biometric template application and an ID data capture application on the MED,
b. Capturing biometric data of the user using the sensor on the MED and providing the biometric data to the IDS,
c. Forming from the biometric data a biometric template on the IDS and storing the biometric template in the memory unit of the MED, providing a registered activated identity MED, and
d. Via the IDS allowing access to a server by the user providing to the IDS, via the MED, matching biometric data and a biometric template.

By capturing biometric data of the user using the sensor of the MED, which may for instance involve taking a self-portrait by the user with the camera of the MED or a thumb print using the touch sensor on the MED, and forwarding the biometric data to the Identity Document Server, a biometric template can be generated on the Identity Document Server. The identity document server is a computer device on which the provider of the identity document has stored authentication data and personalization data pertaining to the identity document and its holder. The software on the Identity document server generates on the basis of the biometric data that is provided to it, a biometric template, which is a numerical and/or graphical representation of the biometric data. This biometric template is returned to the MED and is stored in the memory unit of the MED The IDS stores the status of the MED as a registered activated identity MED The holder of such a registered activated identity MED can request access to an electronic service by forwarding to the IDS a capture of his biometric data ('selfie" portrait or thumbprint) that is forwarded to the IDS together with the template that is stored in the memory of the registered activated identity MED. If the captured biometric user data and the template are found to match on the IDS, access to the e-service can be provided by the IDS.

The method according to the invention provides a secure method of providing remote authorization of a user to electronic services on the basis of the user's registered (on the IDS) identity document. The method provides the user with a 2 factor authentication, involving a trusted MED and one or more biometrics (e.g. face biometrics, thumbprints and the like).

An embodiment of the method according to the invention comprises, preceding step b, the steps of:
Providing an identity document having authentication data and personalization data stored in an electronic memory that is part of the document,
Transferring authentication data and personalization data from the memory of the Identity document into the memory of the MED via the ID data capture application,
Transferring the authentication data and the personalization data from the MED to the IDS via the ID data capture application,
Comparing the transferred authentication and personalization data with authentication and personalization data on the IDS wherein, when the transferred authentication and personalization data correspond with authentication and personalization data on the IDS: a positive comparison status is generated and a subscriber number of the MED is stored on the IDS and wherein in the absence of a positive a comparison status steps c-f are prevented from being carried out.

In the registering stage, the chip of the identity document is read out using the data capture application on the MED and the authentication data and personalization data obtained from the chip are sent to the IDS for verification. Registration can only be completed via the MED if the verification on the IDS results in a positive comparison status.

A further embodiment of a method of authorizing a user of an identity document comprising biometric user data that are stored in an electronic memory that is part of the identity document, involves the steps of:
Reading the biometric user data from the electronic memory of the identity document and storing the biometric user data in the memory unit of a mobile electronic device (MED), the MED having a sensor for receiving biometric data of the user,
Capturing biometric data of the user using the sensor on the MED and storing the data in the memory unit, and
Comparing the captured biometric data with the stored biometric user data and generating a positive authentication status when the captured biometric data match the stored biometric data.

By reading out the biometric data from the memory of the identity document, a reference is obtained on the MED for comparing with live biometric data captured via the MED's sensor. Only when a local match is made on the MED between the live biometric data and the biometric data that are captured from the ID's electronic memory, will further steps in the authentication procedure, in particular the procedure of registering the user and MED as a registered activated identity MED on the IDS, be allowed.

Access of a server for receiving an on line service, for instance on a government server on which registered citizen data of the user are stored, can according to an embodiment of a method according to the invention be carried out by the steps of:
Input of a user-identification to the IDS by the holder of a registered activated identity MED and receiving a notification on the registered activated identity MED,
Inputting biometric data of the holder via the sensor into the memory unit of the MED,
forwarding the biometric data and the template from the MED to the IDS, and On the IDS comparing the template and the biometric data, and for a positive match providing access to the user on a server) and/or to receiving of a service on the MED or on the terminal.

In a preferred embodiment, the captured biometric data comprises a portrait image of the holder, the sensor comprising a camera and the biometric template being formed on the basis of the portrait image.

The biometric template may be formed on the basis of at least two portrait images, such as for instance by the best out of three.

A further embodiment of a method according to the invention, wherein the identity document comprises machine readable data, the method comprises following on step b, the steps of:
Transferring the machine readable data into the memory unit of the MED via the camera and the ID data capture application, and comparing the machine readable data with the personalization data transferred from the memory of the Identity document into the memory unit of the MED and generating a consistency status, wherein
In case of a negative consistency status the MED does not carry out the subsequent step of transferring data from the MED (2) to the IDS.

By a local comparison on the MED of the MRZ that is optically presented on the ID with the MRZ data contained in the electronic memory of the ID, a further verification step is provided that improves the security of the method according to the invention.

BRIEF DESCRIPTION OF THE DRAWINGS

An embodiment of a method, a system, a mobile electronic device and a software programme product according to the invention will be described in detail with reference to the accompanying drawings. In the drawings:

FIG. 3 shows reading of authentication data and personalization data from the memory chip and a machine readable zone (MRZ) of an Identity document into the memory of the MED, FIG. 4 shows transferring the authentication and personalization data to the IDS for forming a registered MED.

FIG. 12 shows a flow diagram of the authorization steps for obtaining access to an e-service corresponding to FIGS. 6 and 7, and FIG. 13 shows the user interaction while carrying out the steps of FIG. 12.

DETAILED DESCRIPTION OF THE INVENTION

Figure 1:
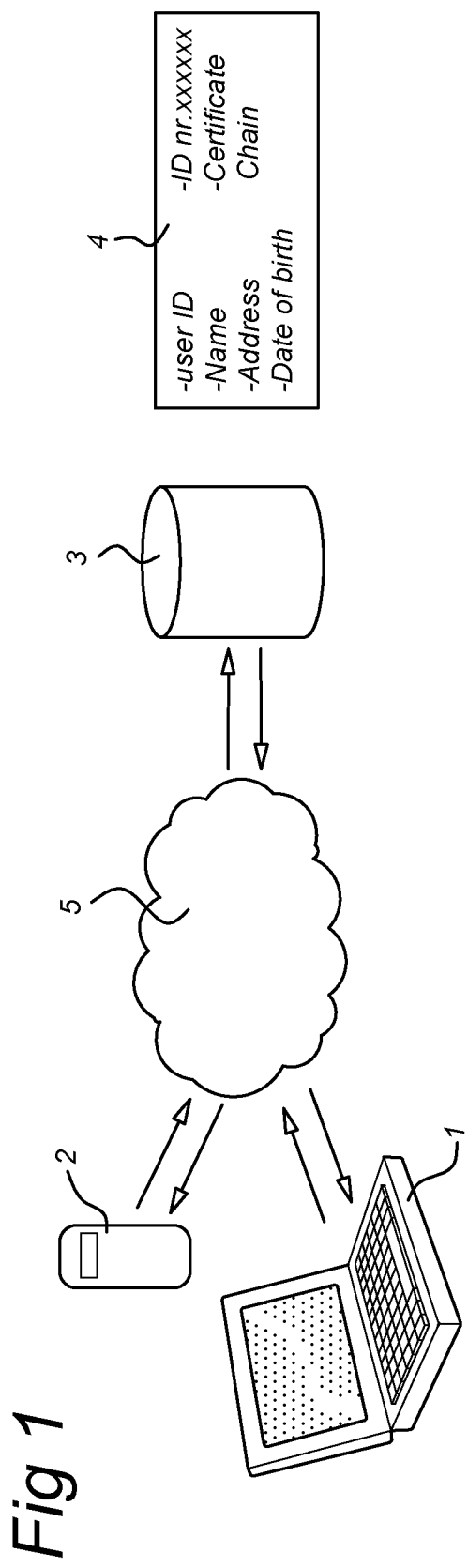
FIG. 1 shows the first step in the registration of a user's mobile electronic device (MED) on an identity document server (IDS)

FIG. 1 shows a remote terminal 1 or a mobile electronic device (MED) 2 being connected via the internet 5 to an Identity Document Server (IDS) 3. The IDS 3 stores records 4 of personalization data of the holder of an identity document and authenticity data of such an identity document, and may be operated by the company or organization that has issued the identity document. The identity document can for instance be a passport, a driver's license, a bank card, credit card or identity card or badge and may be wholly or partly in electronic form. The personalization data comprises for instance name, address, date of birth and/or biometric data such as a digital portrait template, a finger print or an iris scan, which data may be provided in a Machine Readable Zone (MRZ) of the ID or which may be stored in the electronic memory of a chip on the ID. The authentication data may comprise a unique number, a certificate or certificate chain, security codes and the like.

Figure 2:
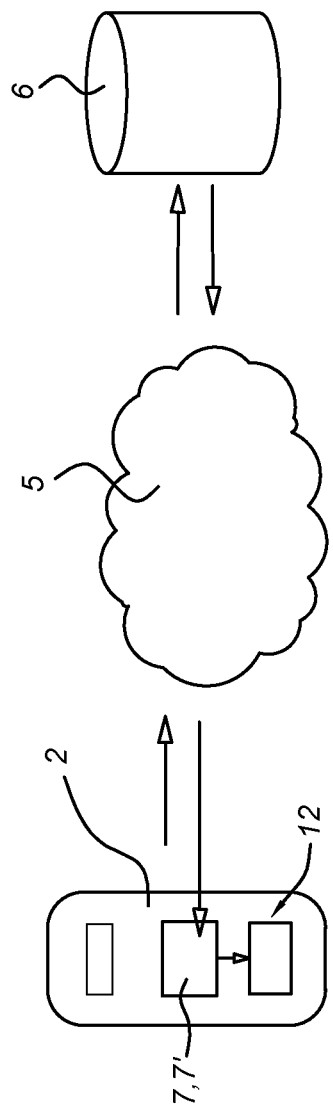
FIG. 2 shows the step of downloading of a biometric application and a data capture application on the MED.

Upon input of a user ID, and optionally a password, a user may be logged on to the IDS 3 and may be provided with a code or a link for downloading an application onto the MED 2, as shown in FIG. 2. The code that is provided may be alphanumeric and can be entered via the MED to log onto server 6, or can be a QR code that is displayed on the display of the terminal 1 and recorded with the camera of the MED to connect the MED to a server 6, or can be an IP address of the server 6 or a similar code. From the server 6, a biometric template application 7' and ID data capture application 7 is downloaded onto the MED 2. Alternatively, the IDS 3 provides a notification to the MED 2 that the applications 7, 7' can be downloaded from another server of an application provider which has been authorized by the IDS to allow a download from that server by the user.

As shown in FIG. 3, the ID data capture application 7 allows transfer of identification and personalization data that are stored in the memory chip 10 of an identity document 11 to be transferred to a memory unit 12 of the MED. Data transfer can be carried out wireless via Bluetooth, Near Field Communication (NFC), or via a physical connection of the MED 2 to the chip 10 via a card reader. In specific cases, data may also be provided on the identity document 11 in a machine readable zone (MRZ) 13, for instance in the form of a barcode. The data capture application 7 on the MED controls transfer of the machine readable data into the memory 12 of the MED via the camera 14, and may carry out a first consistency check on the data derived from the MRZ. If an inconsistency is found, the data capture application 7 on the MED may shut down further execution of the proofing and registration steps.

In case a MRZ 13 is provided on the identity document 11, the data capture application 7 may execute a further consistency check by comparing the machine readable data with the data derived from the chip 10, and in case of a mismatch shut down further operation of the application. It is at this stage also possible that the data capture application 7 executes on the MED a comparison of a selfie photograph of the user, taken with the camera 14 of the MED, with the electronic template of the portrait 15 that is stored in the chip 10 of the identity document. In case of an inconsistency between the template of the portrait 15 and the recorded selfie, the data capture application may shut down further operation.

In FIG. 4 it is illustrated how the personalization data and authentication data from the identity document 11 is transferred from the memory unit 12 of the MED to the IDS 3. In the IDS 3, the personalization data and authentication data are compared with the data sets 4 of the identity documents that are stored on the sever, including for instance comparison of the document's unique number, the certificate chain etc. In case the comparison gives matching results, the server 3 generates an activation code that is forwarded to the MED 2 or to the remote terminal 2, on which it may appear as a QR code on the screen and can be captured by the camera 14 of the MED The subscriber number of the Med has been stored with the data record 4 of the identity document 11 on the IDS 3, so that the MED 2 now is a registered MED After returning the activation code to the IDS 3, the biometric template application 7' that has been downloaded from the server 6 may be activated. The MED is now registered as a registered activated MED on the IDS 3.

Figure 5:
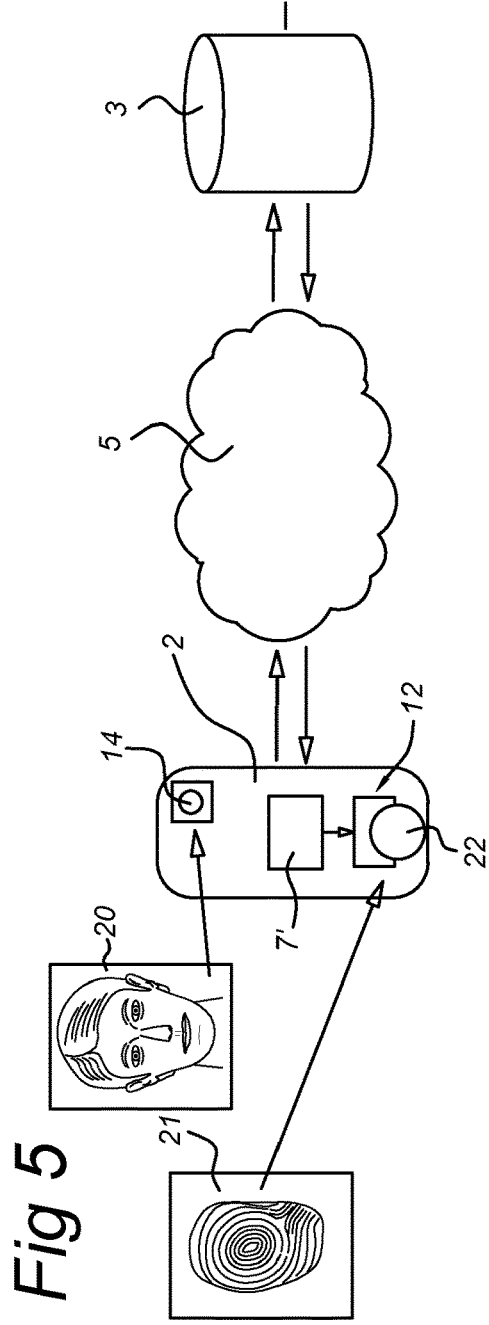
FIG. 5 shows the steps of forwarding biometric user data from the MED to the Identity Document Server for forming a biometric template and storing the template on the MED to form a registered activated identity MED.

FIG. 5 shows in the activation stage of the MED, biometric data 20, 21 of the user being input into the MED 2 via the biometric template application 7'. The biometric data may comprise a portrait picture 20 of the user, captured by the camera 14 of the MED or a fingerprint 21 captured by a touch sensor 22 on the MED 2. Other biometric data may be used, such as an iris scan, and the like. The biometric data 20, 21 are transferred to the IDS 3 and converted into biometric templates 23, 24. The facial template may be formed by a set of key positions such as eyes, corners of the mouth, nose, chin and cranial points or another representation that is formed on the basis of the digital image 20. A thumb print template 24 may for instance be formed by a binary representation of the lines or interspaced positions that are derived on the basis of the thumb print image 21. The reference template 23, 24 may be stored on the IDS 3 together with the record 4 of the identity document. Alternatively, the reference template 23, 24 is coded and secured against eavesdropping, and is returned to the MED, is stored in the memory unit 12 and is not retained on the IDS 3. This completes the registration/activation stage and results in a registered activated identity MED 2.

Figure 6:
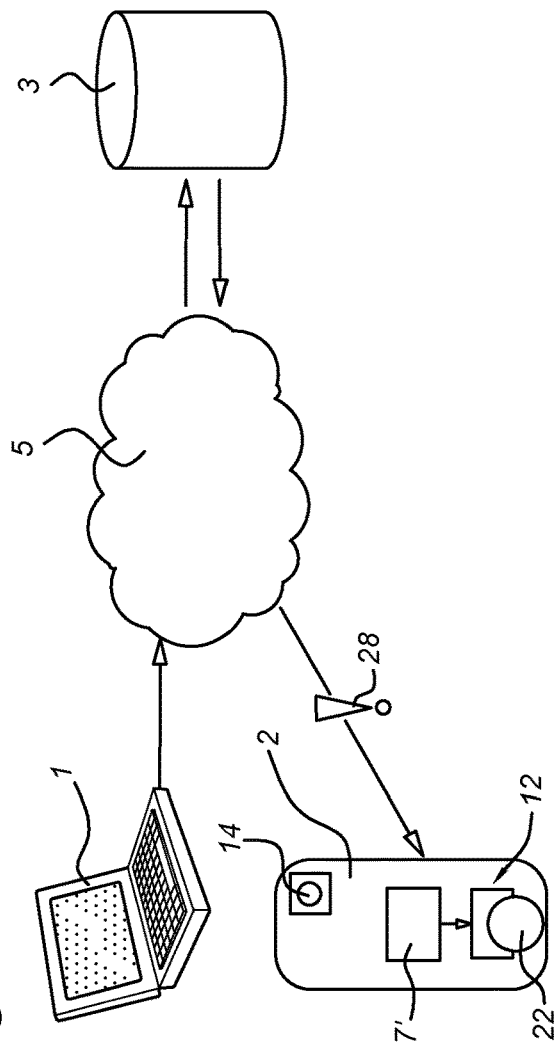
FIG. 6 shows the first step in the authentication stage for obtaining access to an electronic service provider.

FIG. 6 shows the first step in the authentication stage wherein a user wants to access an on-line service or an e-service 29 via the terminal 1. The user is in possession of a registered activated identity MED 2. The user on the terminal 1 selects the identity provider, which is the issuing organization from which the user has received his identity document and on whose IDS 3 the users MED has been registered as a registered activated identity MED After input of the user's username and password to the IDS3, the activated identity MED 2 receives a notification 28 from the IDS 3. Using the camera 14 and/or the touch sensor 22 of the MED 2, the user takes a portrait image ('selfie') 20' or a fingerprint 21'. The portrait image 20' and the portrait template 23 that has been stored in the memory 12 of the registered activated identity MED2, are transferred to the IDS 3 via the biometric template application 7'. Alternatively, or in addition, the thumbprint 21' and thumbprint template 24 may be transferred to the IDS. On the IDS 3, it is determined if images 20', 21' correspond to the templates 23, 24. If a positive match is made, the IDS 3 provides an authorization to the service provider 29, allowing access by the user on the server, or other interaction required for receiving the e-service, via the terminal 1.

The terminal 1 may be a computer terminal or may be a personal computer, a laptop, a tablet or other a mobile electronic device, and may for instance also be formed by the MED 2.

Figure 8:
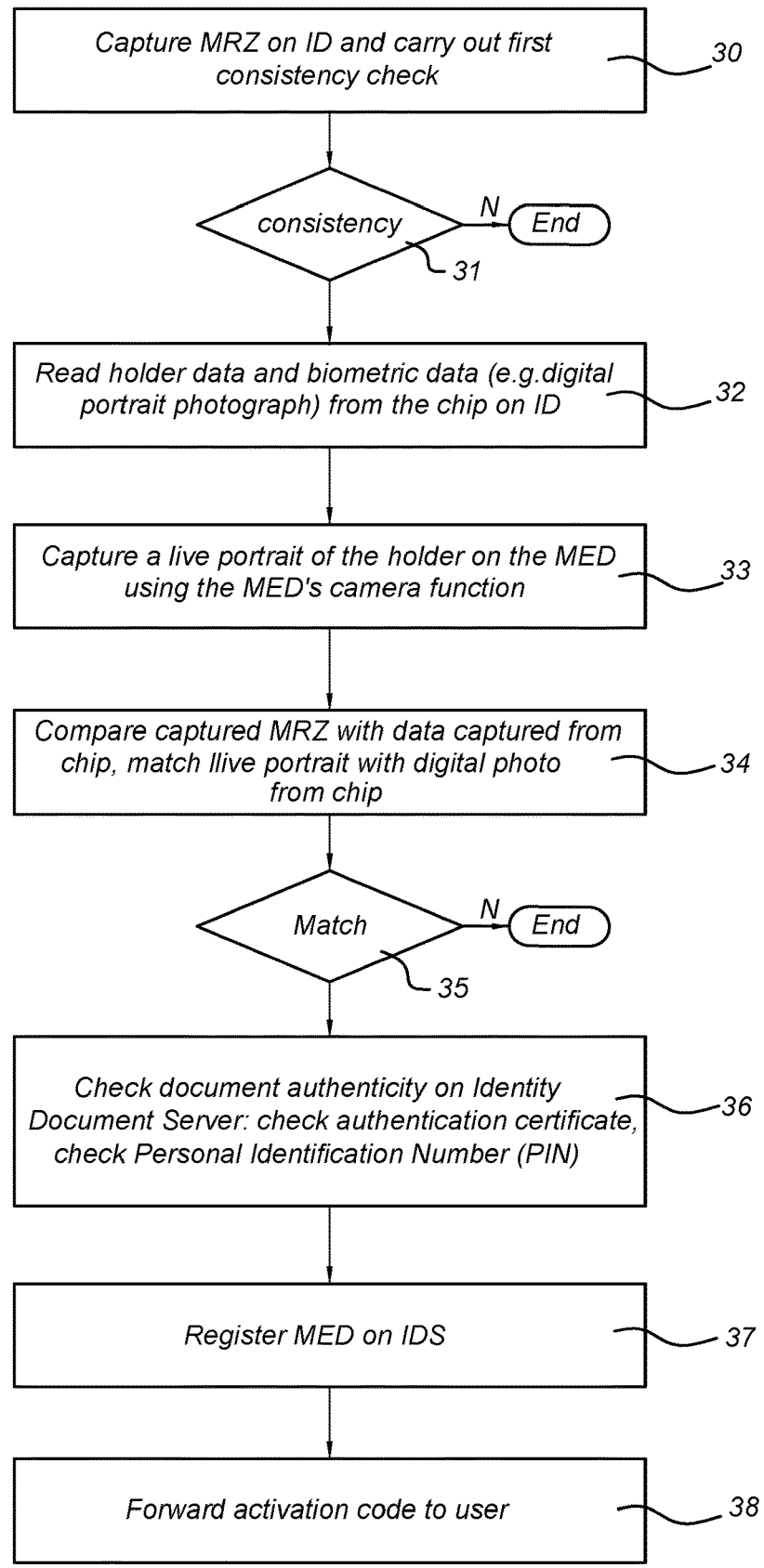
FIG. 8 shows a flow diagram of the steps of ID Proofing and registration of a user and of a MED on the IDS, corresponding to FIGS. 1-4.

FIG. 8 shows the ID proofing and registration steps 30-38 according to the invention and described here before in relation to FIGS. 1-4. In step 30 the holder of an ID document 11 utilizes the camera 14 on the MED 2 on which the ID data capture application 7 and the biometric template application 7' have been downloaded and installed, to capture authentication data from the machine readable zone MRZ of the ID. A first consistency check is carried out on the MED at 31 by the ID data capture application 7 to check if the authentication data in the MRZ has not been altered in an unauthorized manner.

In step 32, electronic personalization data of the holder and biometric data such as a digital photograph are read from the chip 10 on the ID, using the MED's NFC transmitter or wireless Bluetooth communication unit. Step 33 involves taking a self-portrait or 'selfie' by the user with the camera 14 of the MED 2. In step 34 a comparison is carried out locally on the MED to check if the data captured from the MRZ match with the data read from the chip 10. Also, via the data capture application 7 on the MED, a comparison is made at 35 between the digital self-portrait taken by the user using the camera 14 of the MED and the digital photograph that is stored on the chip 10 of the ID. In the absence of a positive match, the data capture application 7 terminates the operation and prevents the subsequent steps 36-38 from being carried out.

In case a positive comparison status is generated, the MED in step 36 transfers the personalization data and the authentication data that have been captured on the MED from the MRZ and from the chip 10 of the ID 11, to the IDS 3. On the IDS 3, the data is checked and verified, such as a check of the ID's authentication certificate, unique number, PIN code and other coded data that pertain to the ID and that have been stored as records on the Identity Document Server.

If a positive comparison status is found on the IDS, the MED is in step 37 registered on the IDS, for instance by storing the subscriber number of the MED together with the record containing personalization and authentication data of the holder of the IDS. In step 38, an activation code is generated on the IDS 3 which code is forwarded back to the user via terminal 1 or via the MED 2.

Figure 9:
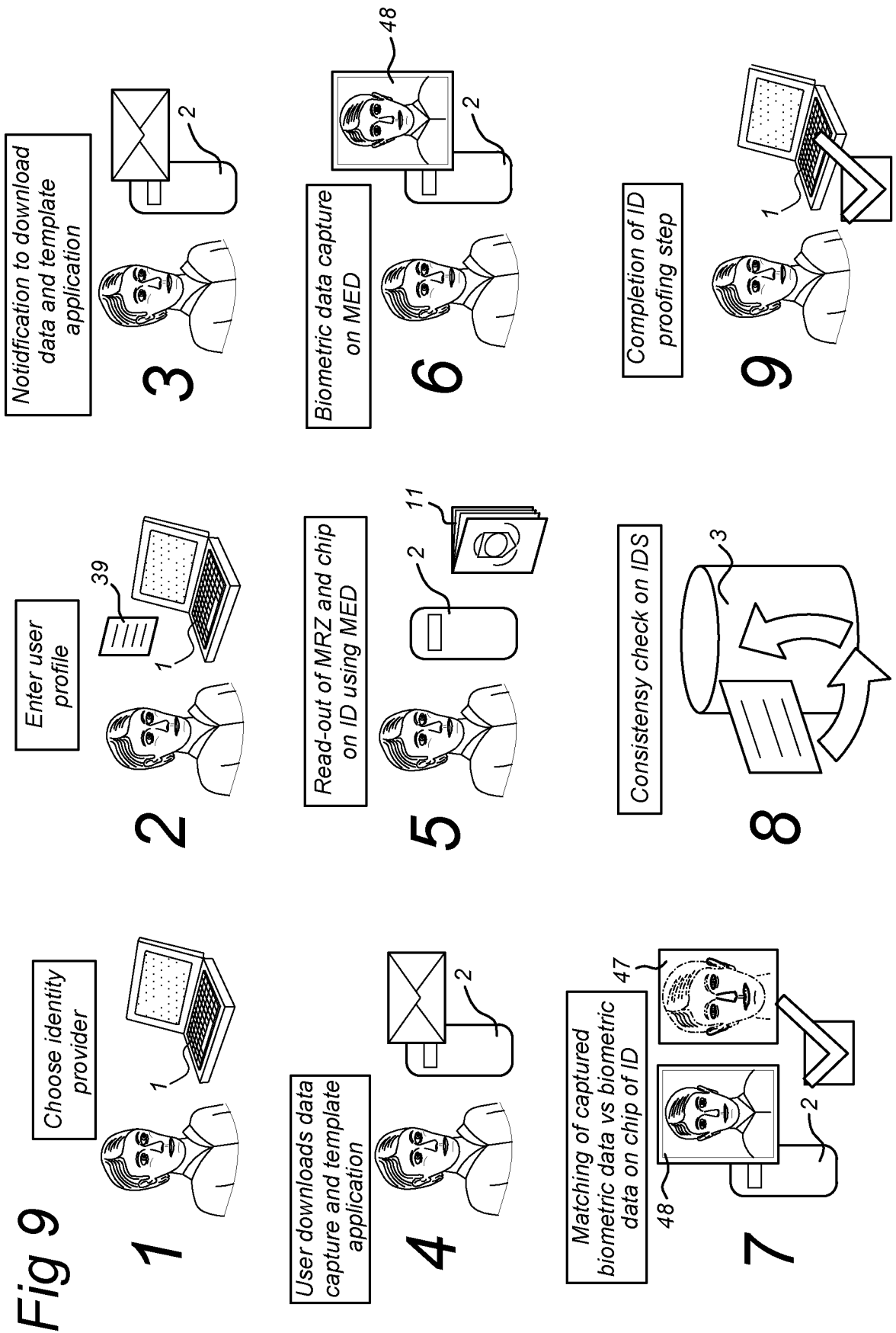
FIG. 9 shows the user interaction while carrying out the steps of FIG. 8.

FIG. 9 schematically shows the actions carried out by the holder of an identity document in the ID proofing and registration steps 30-38 of FIG. 8.

In step 1 the holder chooses the identity provider and accesses the website of the identity provider on the terminal 1. Step 2 involves entering the user's profile details 39 on the website of the identity provider, such as user name, email address and subscriber number of the user's MED In step 3 the user is notified by the IDS 3 on its MED 2 that the data capture application 7 and biometric template application 7' can be downloaded on the MED 2.

In step 4 of FIG. 9, the user downloads the application 7,7' on the MED 2 and in step 5 captures with the application 7,7' on the MED the personalization and authentication data from the MRZ 13 and from the chip 10 of the user's ID, in this example the user's passport 11. The ID has been issued by the identity provider and personalization data of the holder/user and authentication data pertaining to the ID have are stored on the server of the identity provider (IDS 3). Steps 30-32 in FIG. 8 have now been completed.

In step 6 of FIG. 9, the user takes a self-portrait, or 'selfie' 48 with the camera of the MED 2. In step 7 a comparison is made on the MED 2 using the application 7, 7', of the photo 48 with the digital portrait image 47 that has downloaded onto the MED from the chip 10 of the passport 11. This corresponds to step 35 of FIG. 8. If no positive match is obtained, the MED 2 terminates further operation and does not forward the personalization data and authentication data that were captured from the chip 10 of the passport 11 to the IDS 3, completing step 35 in FIG. 8.

When a positive match is found between the self-portrait 48 and the digital photograph 47, which digital photograph may be in the form of a template comprising a number of features of the user's face such as position of eyes, nose, mouth, chin, circumference of the face, etc., the captured authentication data and personalization data are transferred from the MED 2 to the IDS 3 in step 8. On the IDS 3, data consistency checks are carried out which may involve an external service to check if the ID (which may be an entirely electronic document) is genuine, for instance involving verification of the consistency between the document unique number and the captured data, inspection of the authentication certificate, and other verification steps. This corresponds to step 36 of FIG. 8.

In step 9 of FIG. 9 the registration of the MED 2 on the IDS3 is completed and steps 37 and 38 of the ID proofing stage shown in FIG. 8 are completed.

Figure 10:
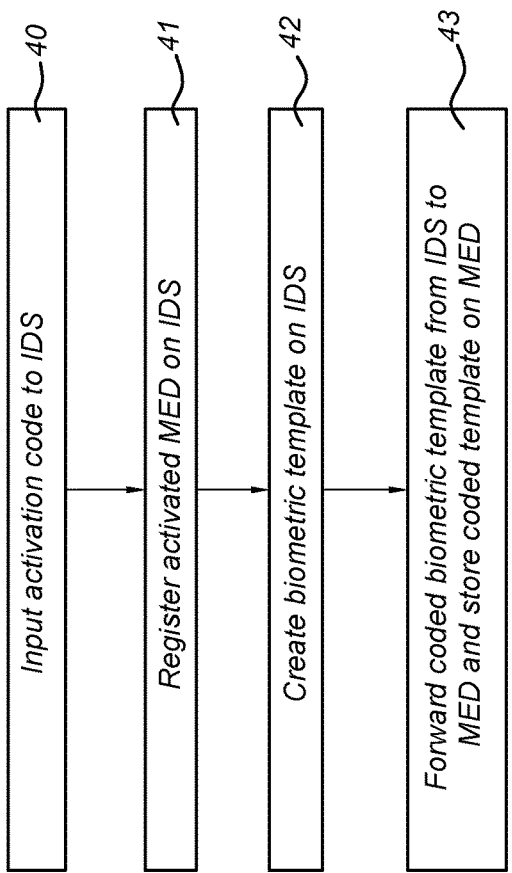
FIG. 10 shows a flow diagram of the activation steps following on the ID-proofing and registration steps of FIG. 8 and corresponding to FIG. 5.

FIG. 10 show activation steps 40-43 that are carried out on the IDS 3. In step 40 the user scans the activation code 16 which may be QR code displayed on the remote terminal 1 (see FIG. 4). The code may also comprise an alfa numeric code and may also be received on the user's MED. After input of the code to the IDS 3 in step 40, the MED 3 is registered as an activated MED in step 41.

In step 42, the IDS will create a reference biometric template 23, 24 of the user. The biometric data may comprise a thumbprint, iris scan or any other biometric data that may be captured with the sensors of the MED In this example, the biometric data comprise a portrait photograph of the user. The user provides one more selfie photographs to the IDS via the MED, and from the best of three the software on the IDS calculates a biometric reference template 23, 24. This reference template is coded and is returned to the MED 2 in step 43, completing the activation stage. This results in the user now having a registered activated identity MED with a 2 factor authentication: a trusted MED and face biometrics.

Figure 11:
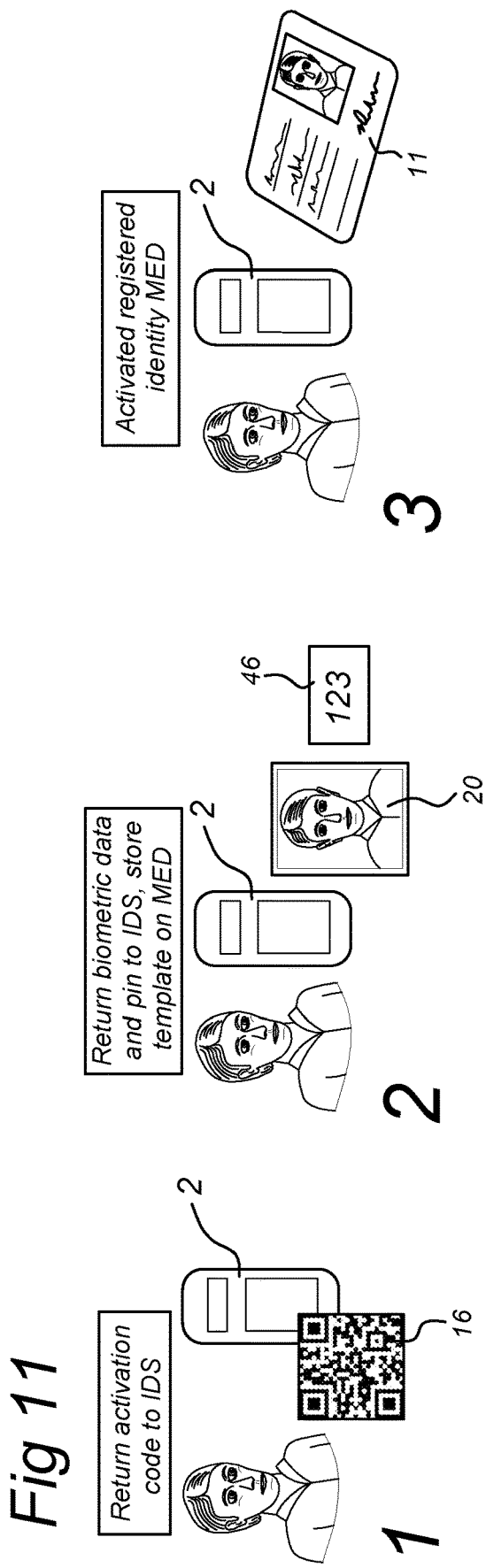
FIG. 11 shows the user interaction while carrying out the steps of FIG. 9.

FIG. 11 schematically shows the actions carried out by the user in the activation steps 40-43 of FIG. 10. In step 1, the user scans the returned activation code 16 on the MED 2. Step 2 involves forming of the reference biometric template (step 42 of FIG. 10) on the IDS, on the basis of one or more selfie photographs 20, (or other biometric data 21 captured on the MED 2) the user makes with the MED's camera, and storing the reference template 23,24 on the MED (step 43 of FIG. 10). The user may register his Personal Identification Number (PIN) 46 with the IDS 3 as a fallback position in case authentication via the reference biometric template 23,24 inadvertently fails to provide authentication. In step 3, the user is now provided with a 2 factor authentication on his MED 2 including face or thumbprint biometrics, which can now be used instead of identity document 11.

Figure 7:
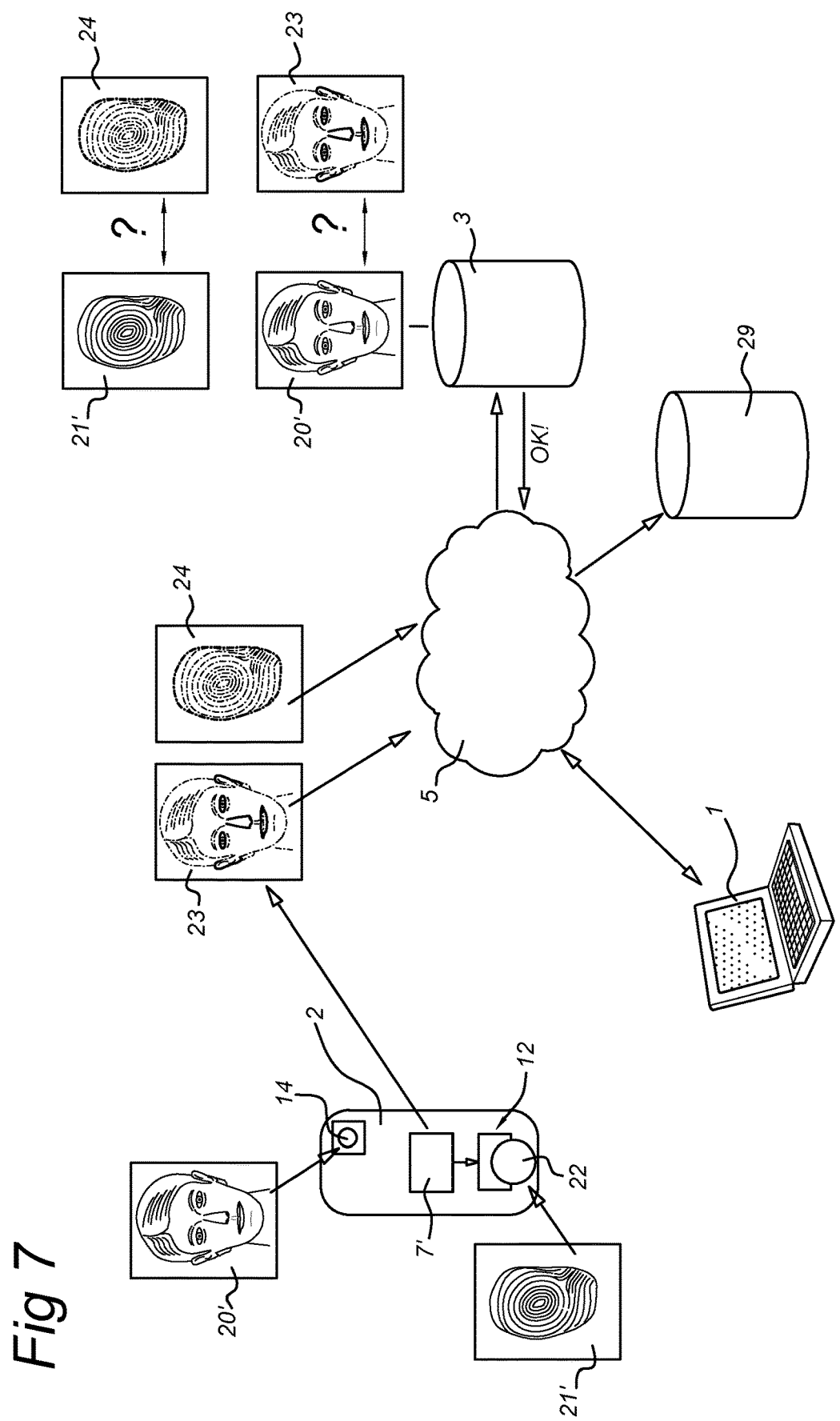
FIG. 7 shows in the authentication stage the forwarding the user's biometric data and the biometric template from the MED to the IDS, for providing authorization for access to a server and/or for receiving of an e service.

FIG. 12 shows the steps 50-55 of the authentication stage for obtaining access by a user to an e-service on a server 29 as illustrated above in relation to FIGS. 6 and 7. In step 50 the user selects on the site of the e-service provider the Identity provider and forwards to the identity provider—that operates the IDS3—a user name and password. In step 51 a notification 28 is forwarded from the IDS3 to the registered activated identity MED 2 of the user indicating that the IDS 3 is ready to carry out the authentication steps. Step 52 involves using the registered activated MED2 to capture biometric data, in this example a self-portrait 20'. The MED2 forwards in step 53 the captured biometric data 20', 21' and the biometric template 23, 24 that is stored in its memory unit 12, to the IDS 3. On the IDS 3, the biometric data 20', 21' and the templates 23, 24 are processed and compared in step 54. Step 54 terminates the operation in case the comparing operation does not result in a positive match. In case the comparing operation 54 results in a positive match, step 55 involves the IDS 3 providing access for the user to server 29 on which the requested e service is carried out.

FIG. 13 schematically shows the actions carried out by the user in the authentication stage 50-55 of FIG. 12. Step 1 involves selection of the e-service by the user. The e-service may for instance involve interaction with the government on a database 29 where the user's citizen's data and certificates are stored. The user selects in step 2 the Identity Provider that has registered the user's MED 2 on the IDS 3 and identifies himself to the Identity Provider by a username and password in step 3. This completes step 50 in FIG. 12. The IDS3 provides a notification 28 to the user's registered activated identity MED2 to indicate that the user should carry out the identity proofing steps 52 and 53 of FIG. 12. The user in step 5 captures biometric data 20', 21' on the MED 2 (step 52 of FIG. 12) and these data are forwarded to the IDS3 for comparing in step 6 (step 53 in FIG. 12). In case a positive match of the biometric data 20',21', and the biometric template 23,24 is established on the IDS3 (step 54 of FIG. 12), the IDS 3 provides access for the user to the e service on server 29 in step 7 (step 55 in FIG. 12).

The invention claimed is:

1. A method of authorizing a user to one or more of (i) access a first server and (ii) receive an on-line service, the method comprising:
storing a subscriber number of a mobile electronic device (MED) on an identity document server (IDS) comprising, for a set of holders of a respective identity document, authentication data and personalization data corresponding to the respective identity document;
loading a biometric template application and an ID data capture application on the MED having a memory and a sensor configured to receive biometric data;
capturing the biometric data of the user using the sensor on the MED and providing the captured biometric data to the IDS;
forming a biometric template from the captured biometric data on the IDS and storing the biometric template in the memory of the MED, thereby providing a registered activated identity MED; and
allowing one or more of (i) access to the first server and (ii) receipt of the on-line service, by receiving matching biometric data and the biometric template, provided by the user to the IDS, via the registered activated identity MED.

2. The method according to claim 1, further comprising, before the capturing the biometric data and the forming the biometric template:
providing the identity document having the authentication data and the personalization data stored in an electronic memory that is part of the identity document;
transferring the authentication data and the personalization data from the electronic memory of the identity document into the memory of the MED via the ID data capture application;
transferring the authentication data and the personalization data from the MED to the IDS via the ID data capture application; and
comparing the transferred authentication and personalization data with authentication and personalization data stored on the IDS,
wherein, when the transferred authentication and personalization data correspond with the stored authentication and personalization data on the IDS, a positive comparison status is generated and a subscriber number of the MED is stored on the IDS, and
wherein, when the transferred authentication and personalization data does not correspond with the stored authentication and personalization data on the IDS, the positive comparison status is not generated and the forming the biometric template and the allowing access or receipt are prevented from being carried out.

3. The method according to claim 2, wherein the personalization data that are captured from the identity document and stored in the memory of the MED comprise biometric data of one of the holders of the identity document, and
wherein the captured biometric data are compared with the biometric data of the one of the holders of the identity document, and
wherein, when the captured biometric data does not match the biometric data of the one of the holders of the identity document, the MED does not carry out the transferring the authentication data and the personalization data from the MED to the IDS.

4. The method according to claim 1, further comprising:
receiving input of a user-identification to the IDS by a holder of the registered activated identity MED and receiving a notification on the registered activated identity MED;
inputting biometric data of the holder of the registered activity identity MED via the sensor into the memory of the registered activated identity MED;
forwarding the biometric data and the biometric template from the registered activated identity MED to the IDS; and
comparing the biometric template and the biometric data on the IDS, and when there is a positive match, one or more of (i) providing access to the user on a server (ii) receiving a service on the registered activated identity MED or on the terminal.

5. The method according to claim 1, wherein the sensor comprises a camera,
the captured biometric data comprises a portrait image of one of the holders of the identity document taken by the camera, and
the biometric template is formed based on the portrait image.

6. The method according to claim 4, wherein the biometric template is formed based on at least two portrait images.

7. The method according to claim 1, wherein the identity document comprises machine-readable data, further comprising, after the capturing the biometric data:
transferring the machine-readable data into the memory of the MED via a camera and the ID data capture application, comparing the machine-readable data with the personalization data transferred from the memory of the identity document into the memory of the MED, and generating a consistency status based on the comparing, wherein, when the consistency status is negative, the MED does not subsequently carry out transferring data from the MED to the IDS.

8. A method of authorizing a user of an identity document including biometric user data that are stored in an electronic memory that is part of the identity document, the method comprising:

reading the biometric user data from the electronic memory of the identity document and storing the read biometric user data in a memory of a mobile electronic device (MED), the MED having a sensor configured to receive biometric data of the user;

capturing the biometric data of the user using the sensor on the MED and storing the captured biometric data in the memory of the MED;

comparing, on the MED, the captured biometric data with the stored biometric user data;

generating a positive authentication status when the captured biometric data match the stored biometric user data; and transferring authentication data and personalization data corresponding to the respective identity document from the MED to an identity document server (IDS) when the captured biometric data match the stored biometric user data.

9. A system for authorizing a user to one or more of (i) access a server and (ii) receive an on-line service, the system comprising:

a mobile electronic device (MED) comprising
a memory, and
a sensor that receives biometric data; and an identity document server (IDS) comprising, for a set of holders of a respective identity document, authentication data and personalization data corresponding to the respective identity document, wherein the system:
stores a subscriber number of the MED on the IDS,
loads a biometric template application and an ID data capture application on the MED,
captures biometric data of the user using the sensor on the MED and provides the captured biometric data to the IDS,
forms a biometric template from the captured biometric data on the IDS and storing stores the biometric template in the memory of the MED, thereby providing a registered activated identity MED, and
allows one or more of (i) access to the server and (ii) receipt of the on-line service, by receiving matching biometric data and the biometric template, provided by the user to the IDS, via the registered activated identity MED.

10. The system according to claim 9, further comprising an identity document having authentication data and personalization data stored in an electronic memory that is part of the identity document, wherein, before the capturing the biometric data and the forming the biometric template, the system:
transfers the authentication data and personalization data from the electronic memory of the identity document into the memory of the MED via the ID data capture application,
transfers the authentication data and the personalization data from the MED to the IDS via the ID data capture application, and compares the transferred authentication and personalization data with authentication and personalization data stored on the IDS, wherein, when the transferred authentication and personalization data correspond with the stored authentication and personalization data on the IDS, a positive comparison status is generated and a subscriber number of the MED is stored on the IDS, and wherein, when the transferred authentication and personalization data does not correspond with the stored authentication and personalization data on the IDS, the positive comparison status is not generated and the forming the biometric template and the allowing access or receipt are prevented from being carried out.

11. The system according to claim 9, wherein the MED captures the personalization data from the identity document and stores the captured personalization data in the memory of the MED, the captured personalization data comprising biometric data of one of the holders of the identity document, the MED capturing the biometric data of the user, using the sensor on the MED and comparing the captured biometric data with the biometric data of one of the holders of the identity document, such that, when the captured biometric data does not match the biometric data of the one of the holders of the identity document, the MED does not carry out the transferring the authentication data and the personalization data from the MED to the IDS.

12. The system according to claim 9, wherein the sensor comprises a camera,
the biometric data comprises a portrait image of one of the holders of the identity document taken by the camera, and
the template is formed based on the portrait image.

13. The system according to claim 9, wherein the identity document comprises machine-readable data, and
the system transfers the machine-readable data into the memory of the MED via a camera of the MED, to compare, on the MED, the machine-readable data with the personalization data transferred from the memory of the identity document into the memory of the MED, and generates a consistency status based on comparing the machine-readable data with the personalization data.

14. A system for authorizing a user of an identity document, the system comprising:
a mobile electronic device (MED) comprising
a memory,
a sensor that receives biometric data of the user, and
an identity document comprising biometric user data that are stored in an electronic memory that is part of the identity document,
wherein the system:
reads the biometric user data from the electronic memory of the identity document and stores the biometric user data in the memory of the MED,
captures biometric data of the user using the sensor on the MED and stores the captured biometric data in the memory of the MED,
compares, on the MED, the captured biometric data with the stored biometric user data and generates a positive authentication status when the captured biometric data match the stored biometric data, and
transfers authentication data and personalization data corresponding to the respective identity document from the MED to an identity document server (IDS) when the captured biometric data match the stored biometric user data.

15. A mobile electronic device (MED) comprising:
a memory; and
a sensor that receives biometric data; and
one or more processors that
   capture the biometric data of a user via the sensor into the memory of the MED,
   read biometric data from an electronic memory that is part of an identity document into the memory of the MED, and
   compare the captured biometric data with the biometric data that have been read from the identity document,
   wherein the memory of the MED comprises an ID data capture application that
      transfers authentication data and personalization data that are read from the electronic memory of the identity document into the memory of the MED,
      transfers the captured biometric data that is captured with the sensor to an Identity Document Server (IDS),
      receives a biometric template from the IDS, and
      stores the received biometric template in the memory of the MED.

16. The mobile electronic device according to claim 15, wherein the sensor comprises a camera,
   the captured biometric data comprises a portrait of a holder of the identity document taken with the camera, and
   the biometric data read from the memory of the identity document comprises one or more of (i) a digital portrait and (ii) a template of a digital portrait of the holder of the identity document.

17. An identity document server (IDS) comprising:
for a set of holders of a respective identity document, authentication data and personalization data corresponding to the respective identity document and that
   receive authentication data and personalization data from a mobile electronic device (MED) of a user, the personalization data from the MED comprising biometric data of the user captured with a sensor of the MED,
   generate a biometric template based on the personalization data and return the biometric template to the MED,
   compare the authentication and personalization data received from the MED with the stored authentication and personalization data,
   generate a comparison status, and
   when there is a positive comparison status, store a subscriber number of the MED for forming a registered MED.

18. The identity document server according to claim 17, wherein the identity document server
   receives, from the MED, biometric template data and biometric data captured with the sensor of the MED,
   compares the biometric template data with the captured biometric data, and
   one or more of (i) provides access to the user on a server and (ii) provides the user access to receive a service on the MED, when the comparing indicates a positive match between the biometric template data and the captured biometric data.

19. The identity document server according to claim 17, wherein the biometric data comprises a portrait image.

20. A computer program product stored in a mobile electronic device (MED), the computer program product comprising:
   a data capture application configured to
      operate on the MED,
      read authentication data and personalization data comprising electronic biometric data from an electronic memory of an identity document into a memory of the MED,
      capture biometric data from a user via a sensor on the MED into the memory of the MED,
      compare the captured biometric data with the electronic biometric data received from the electronic memory of the identity document, and
      generate a comparison status indicating a match of the compared captured biometric data and the stored electronic biometric data,
   wherein the computer program product is configured to receive biometric template data from an identity document server (IDS), to store the biometric template data in the memory of the MED, and to forward the biometric template data together with the captured biometric data to the server.

* * * * *